US005553690A

United States Patent [19]

Takahashi

[11] Patent Number: 5,553,690

[45] Date of Patent: Sep. 10, 1996

[54] LOCKING DEVICE FOR FLUID PRESSURE CYLINDER

[75] Inventor: Hidehito Takahashi, Yawara-mura, Japan

[73] Assignee: SMC Corporation, Tokyo, Japan

[21] Appl. No.: 498,799

[22] Filed: Jul. 6, 1995

[30] Foreign Application Priority Data

Aug. 1, 1994 [JP] Japan .................................... 6-199037

[51] Int. Cl.[6] .................................. F16F 9/44; A47B 9/10

[52] U.S. Cl. ........................ 118/300; 267/64.12; 248/161

[58] Field of Search ............................. 267/64.12, 64.28, 267/131; 188/300; 248/161; 297/344.12, 344.16, 344.19

[56] References Cited

U.S. PATENT DOCUMENTS

| | | | |
|---|---|---|---|
| 3,559,776 | 2/1971 | Schultze | 188/300 |
| 3,828,694 | 8/1974 | Nestlev et al. | 188/300 |
| 3,929,057 | 12/1975 | Kondo | 188/300 |

OTHER PUBLICATIONS

Patent Abstracts of Japan, JP-3-66905, Mar. 22, 1991.

*Primary Examiner*—Robert J. Oberleitner
*Assistant Examiner*—Chris Schwartz
*Attorney, Agent, or Firm*—Oblon, Spivak, McClelland, Maier & Neustadt, P.C.

[57] ABSTRACT

In a body 2 mounted on a side of a fluid pressure cylinder 50 where a rod is projecting, a shoe holder 10 provided with a brake shoe 11 for firmly holding a rod 51 from an outer periphery and for locking it is incorporated, and an eccentric cam means 18 for reducing the brake shoe 11 in diameter is mounted via the shoe holder 10, and a brake cylinder means 4 for driving the eccentric cam means 18 is further provided.

9 Claims, 4 Drawing Sheets

LOCKING DEVICE FOR FLUID PRESSURE CYLINDER

BACKGROUND OF THE INVENTION

1. Field of the Invention

The present invention relates to a locking device for locking a rod of a fluid pressure cylinder at any stopping position as desired.

1. Description of the Prior Art

When a rod of a fluid pressure cylinder is moved by the weight of the load in case fluid pressure is decreased or lost due to power suspension, accident or other causes during operation, it is not only dangerous for the operator but deleterious to other equipment and devices because these may be damaged. To prevent such an accident, a locking device for locking the rod is provided in such system.

As the locking device for the fluid pressure cylinder, a device using an eccentric cam has been proposed in Japanese Patent Publication Laid-Open 3-66905.

This locking device comprises a set of brake members arranged around an axial line perpendicular to the rod with the rod placed therebetween so that the brake members can be eccentrically rotated, and these brake members are always pushed by a spring in such a direction that a thick portion of each of these members is engaged into a gap between the member and the rod (a direction to lock the rod), while, in a normal case, the two brake members are controlled by a brake cylinder so that they are not in locking state. If fluid pressure supplied to the brake cylinder is decreased due to an accident, the control is released, and if resilient force by the spring is applied on the two brake members and the rod is moved in a specific direction, the thick portions of the two brake members are engaged into a gap between the brake members and the rod so that the movement of the rod is locked.

Although the locking device as proposed above is advantageous in that the rod can be locked when fluid pressure is decreased or lost due to accident, the brake cylinder is arranged with its axial line in parallel to the rod and the brake piston is moved in an axial direction of the rod. As a result, the locking device is very long in axial direction and the device must be designed in large size.

Also, because the locking is achieved in a specific direction, if the rod is to be locked in two reciprocating directions, it is necessary to arrange two sets of the locking devices in series in axial direction of the rod. This means that larger space is required for installation.

Further, the locking force may be different according to each brake member because of the possible manufacturing errors of the brake piston or the brake members, and it is very difficult to adjust or control the locking force.

SUMMARY OF THE INVENTION

It is a principal object of the present invention to provide a locking device for a fluid pressure cylinder, which is designed in more compact size and can lock a rod in two reciprocal directions.

It is another object of the present invention to provide a locking device, which can provide a high locking force despite of its small size.

It is still another object of the present invention to provide a locking device, in which a locking force can be adjusted in an easier manner.

To attain the above objects, the locking device of the present invention comprises a body mounted on a fluid pressure cylinder in such manner that a piston rod of the cylinder passes therethrough; a shoe holder arranged inside said body, said shoe holder having a shoe mounting hole with a diameter reducible by providing a slit, and said rod is passed through said shoe mounting hole when said body is mounted on the fluid pressure cylinder; a brake shoe mounted in a shoe mounting hole of said shoe holder and for firmly holding the rod as it is reduced in diameter when the shoe mounting hole is reduced in diameter; and eccentric cam means for reducing the shoe mounting hole in diameter by pressing said shoe holder, said eccentric cam means comprising a cam shaft rotatably supported at a given position on said body, a cam member arranged eccentrically on said cam shaft and pressing said shoe holder in a direction to reduce the shoe mounting hole in diameter when said cam shaft is rotated in a normal or locking direction and releasing the pushing pressure when the cam shaft is rotated in a reverse or unlocking direction, and a brake arm extending from said cam shaft in a lateral direction and for rotating said cam shaft in normal and reverse directions.

In the locking device of the above arrangement, the eccentric cam means, the shoe holder and the brake shoe are rotated at given positions or are reduced in diameter and are not moved in the axial direction of the rod. Accordingly, no additional space is required for such movement, and the length of the rod in axial direction can be made shorter. As a result, the entire device can be manufactured in a compact size. Moreover, because locking is not achieved in a specific direction, even when the rod is to be locked in two reciprocal directions, it will suffice only to mount a single locking device on the fluid pressure cylinder, and this means that the fluid pressure cylinder with the locking device can be designed in smaller size.

In a concrete aspect of the present invention, the shoe holder has a supporting piece and an operating piece for pressing both sides thereof respectively, said supporting piece is mounted on the body in such a manner that it is movable back and forth, and the supporting position is set on an adjustable position adjusting screw, said operating piece is projected out of the shoe holder more extensively than the supporting piece, and a cam member of the eccentric cam means is brought into contact with its forward end.

In the present invention, it is preferable that a roller bearing is rotatably mounted around the cam member, and that the cam member is brought into contact with the operating piece via the roller bearing, and the roller bearing preferably has its outer peripheral surfaces designed with curved surfaces, i.e. each of the surfaces having the largest diameter at the center in axial direction.

In another concrete aspect of the present invention, a brake cylinder means for rotating the eccentric cam means via the brake arm is mounted on said body with its axial line directed in a direction perpendicular to the rod.

The brake cylinder means comprises in the cylinder body a brake piston connected to the brake arm and a brake spring for pushing the brake piston in a restoring direction. When a pressure fluid is supplied to the brake cylinder means, the brake piston is moved in one direction and rotates the eccentric cam means in the unlocking direction. When the pressure fluid is discharged, the brake piston is moved in the reverse direction by resilient force of the return spring and rotates the eccentric cam means in the locking direction.

The other objects and the arrangements of the present invention will be more clearly understood by referring to the detailed description given below.

DETAILED DESCRIPTION OF THE PREFERRED EMBODIMENT

Figure 1:
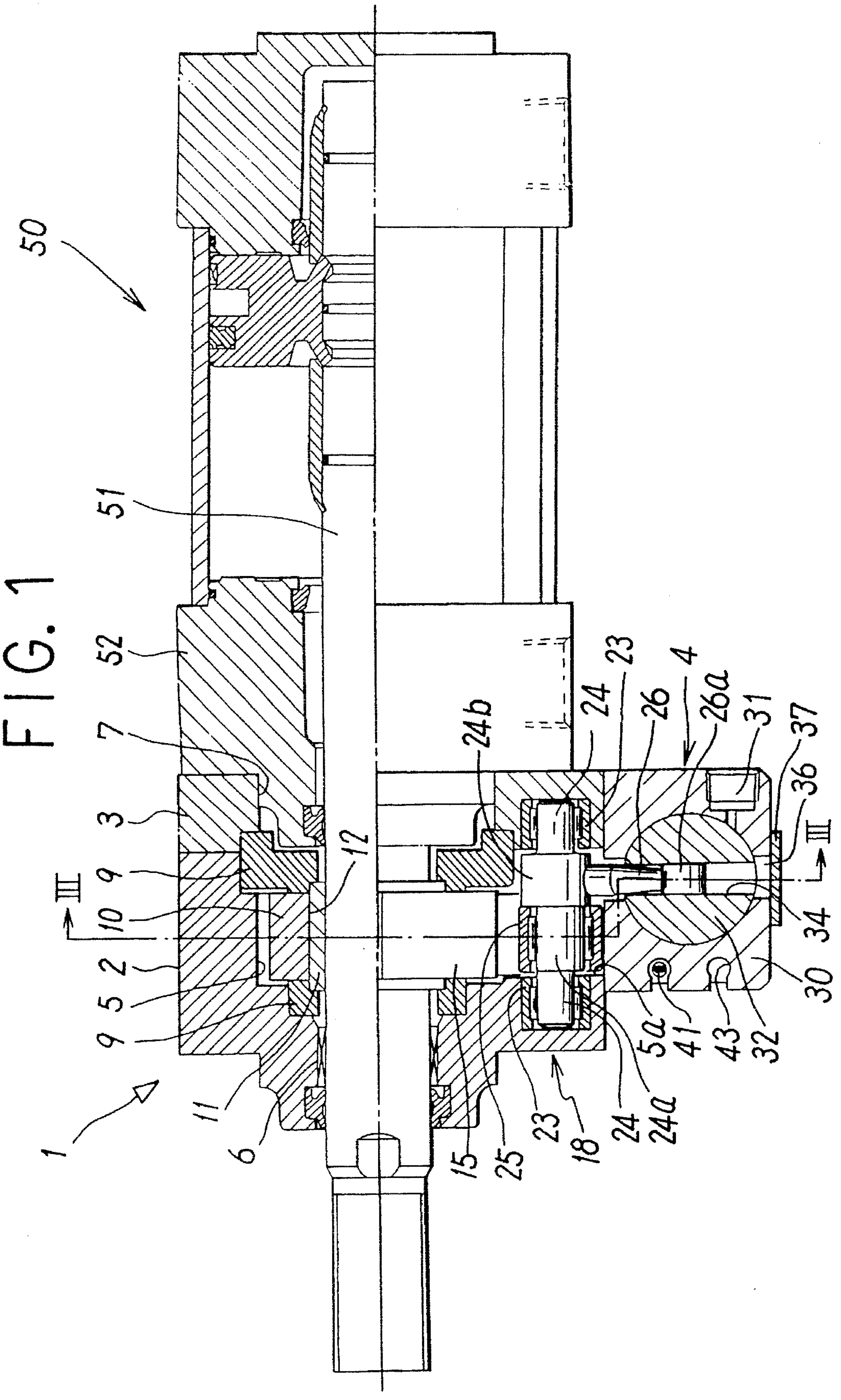
FIG. 1 is a partially cutaway side view of a locking device of the present invention as it is mounted on a fluid pressure cylinder.
Figure 2:
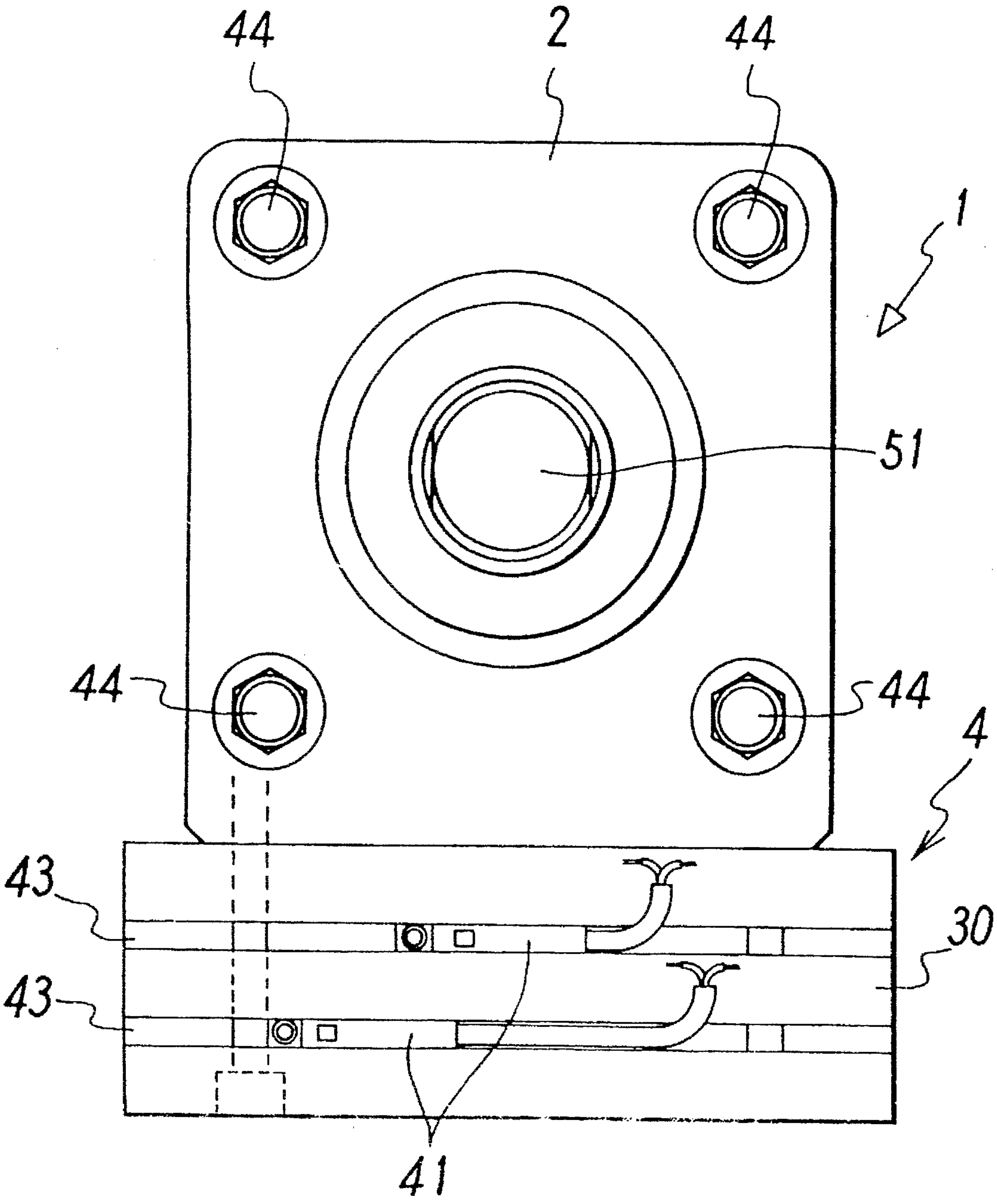
FIG. 2 is a front view of the locking device of FIG. 1.
Figure 3:
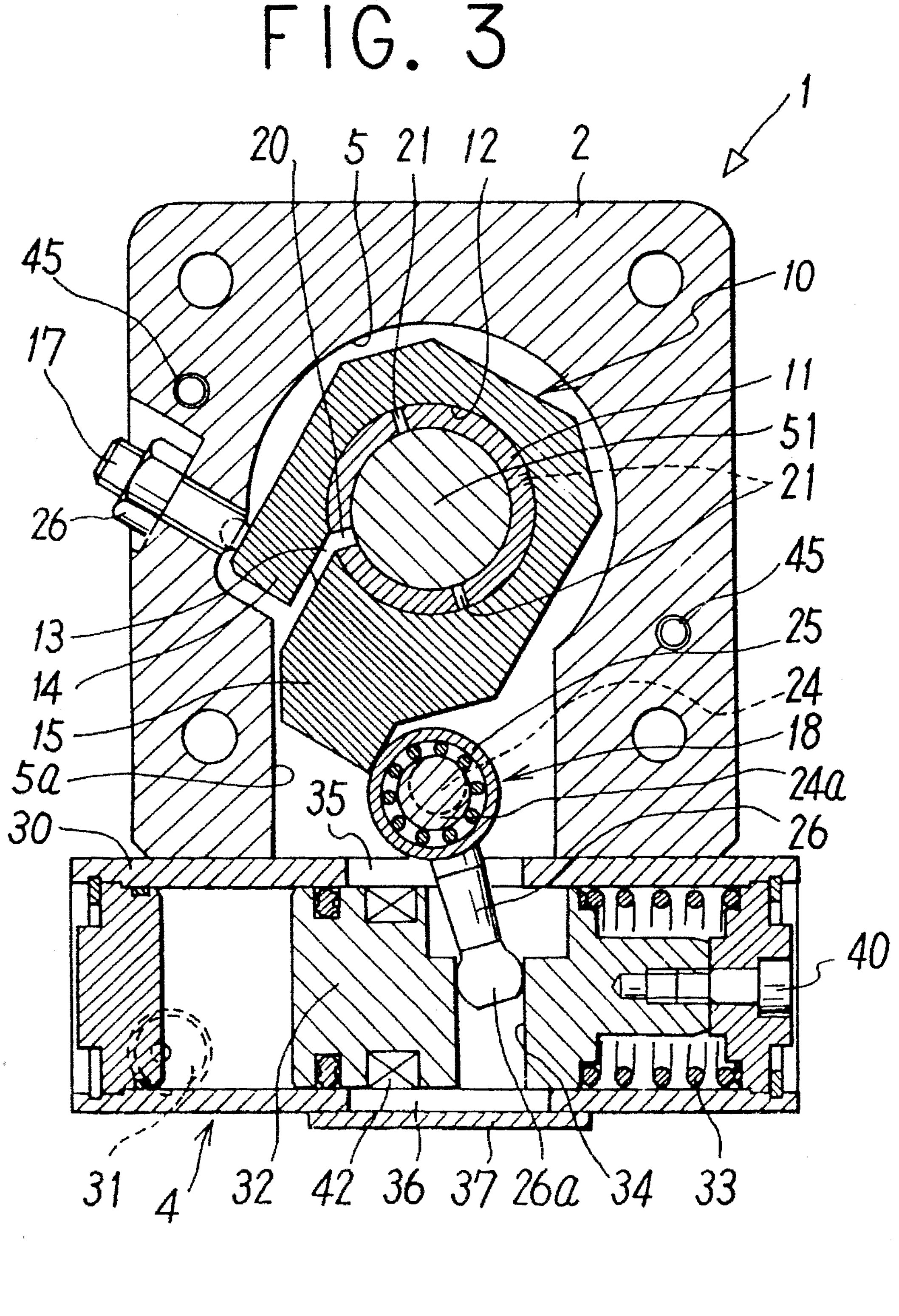
FIG. 3 is a cross-sectional view of the device of FIG. 1 along the line III—III.

FIG. 1 to FIG. 3 each represents a locking device of the present invention as it is mounted on a fluid pressure cylinder 50. The locking device 1 comprises a body 2 provided with a large diameter bore 5 and a small diameter bore 6, through which a piston rod 51 of the fluid pressure cylinder 50 passes, a cover 3 mounted on an end surface of the body 2 closer to the large diameter bore 5, and a brake cylinder means 4 mounted on outer sides of the body 2 and the cover 3, whereby an end of a rod cover 52 of the fluid pressure cylinder 50 is engaged in a mounting hole 7 of the cover 3 and is fixed by an adequate means so that the device can be mounted on a currently operating fluid pressure cylinder 50.

In the large diameter bore 5 of the body 2, a shoe holder 10 and a brake shoe 11 are arranged to surround the rod 51.

Figure 4:
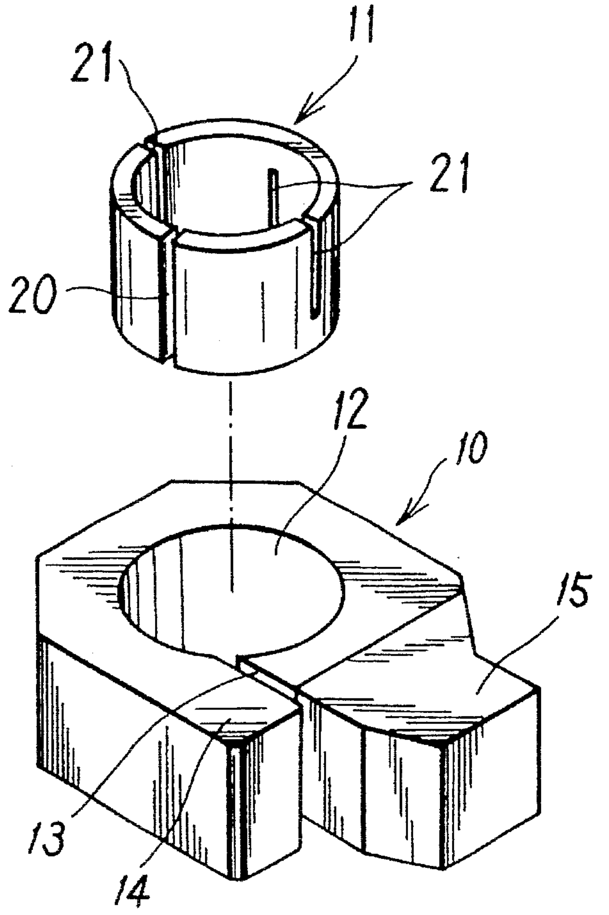
FIG. 4 is a perspective view of a shoe holder and a brake shoe showing them separately.
Figure 5:
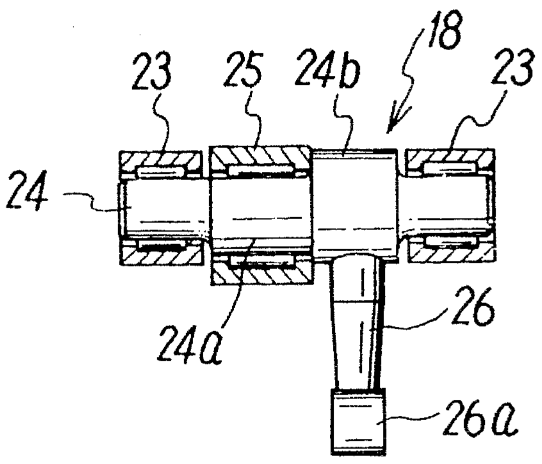
FIG. 5 is a side view of an eccentric cam means.

As it is evident from FIG. 4, the shoe holder 10, made of an elastically deformable material, comprises a shoe mounting hole 12 of approximately circular shape for inserting the brake shoe 11, a slit 13 being cut in the shoe holder from the side so that it is to be continuous to the shoe mounting hole 12, and a supporting piece 14 and an operating piece 15 positioned with the slit 13 therebetween, and the operating piece 15 is more extended outwardly than the supporting piece 14 from the shoe mounting hole 12. The shoe holder 10 is supported by thrust washers 9 and 9 on both sides in the axial direction and is positioned in the large diameter bore 5 with the supporting piece 14 pressed on a stopper 17 provided on the body 2. By pressing on the operating piece 15 using the eccentric cam means 18 as described later and by narrowing the slit 13, the shoe mounting hole 12 is reduced in diameter.

The brake shoe 11 of cylindrical shape, made of a frictional material, comprises a slit 20 cut in its side wall over the entire width and a plurality of expansion slots 21 cut in the side wall alternately from each of the two side ends in the axial direction of the side wall toward the opposite direction and stopped in the middle. When the shoe mounting hole 12 is reduced in diameter, the brake shoe 11 is also reduced in its diameter, thereby firmly grasping the rod 51. When the shoe mounting hole 12 is restored in a direction to increase the diameter, the diameter of the brake shoe 11 is increased due to its elasticity, thereby releasing the rod 51.

On the body 2, a cutout **5*a* is provided from the large diameter bore 5 toward the brake cylinder means 4. On the side of the cutout 5*a* and on inner side of the cover 3 opposite to it, roller bearings 23 and 23 are arranged, and two ends of a cam shaft 24 in the eccentric cam means 18 are rotatably supported by the roller bearings 23 and 23**.

The eccentric cam means 18 comprises a cam unit **24*a* of cylindrical shape provided eccentrically on the cam shaft 24, a roller bearing 25 for pressing purpose engaged on outer periphery of the cam unit 24*a*, a large diameter portion 24*b* coaxially positioned as the cam shaft 24, and a brake arm 26 mounted in a direction perpendicular to the cam shaft 24 on an outer surface of the large diameter portion 24*b*. A forward end 26*a* of the brake arm 26 is projected from the cutout 5*a* out of the body 2 and is connected to the brake cylinder means 4. When the cam shaft 24 is rotated clockwise in FIG. 3 via the brake arm 26 by means of the brake cylinder means 4, the eccentrically displaced cam unit 24*a* pushes the operating piece 15 of the shoe holder 10 via the roller bearing 25, and the shoe mounting hole 12 and the brake shoe 11** are reduced in diameter.

The stopper 17 to be pressed on the supporting piece 14 of the shoe holder 10 is mounted on the body in such manner that it is movable in front-back direction. By moving this back and forth, the supporting position, i.e. the position of the shoe holder 10 in rotating direction, can be adjusted. By this position adjustment, the gap between the operating piece 15 and the roller bearing 25 is adjusted. The stopper 17 can be fixed at any position for forward and backward movement by means of a lock nut 26.

The brake cylinder means 4 is mounted on outer side of the body 2 and the cover 3 where the cutout **5*a* is opened, and it is mounted with its axial line directed in a direction perpendicular to the cam shaft 24 of the eccentric cam means 18, i.e. in a direction in parallel to the moving direction of the brake arm 26**.

The brake cylinder means 4 comprises a brake piston 32 driven by supply and discharge of compressed air through a port 31 and a brake spring 33 for pushing the brake piston 32 in restoring direction, these components being provided in a cylinder body 30. Thus, the brake cylinder means has a function as a single-acting cylinder, and the forward end **26*a* of the brake arm 26 is placed into a channel 34 formed on the brake piston 32. When compressed air is supplied and the brake piston 32 compresses the brake spring and moves toward the position shown in FIG. 3, the cam shaft 24 of the eccentric cam means 18 is rotated counterclockwise via the brake arm 26. As a result, locking of the rod 51 by the brake shoe 11 is released. When compressed air is discharged and the brake piston 32 is moved leftward from the position of FIG. 3 by resilient force of the brake spring 33, the cam shaft 24 of the eccentric cam means 18 is rotated clockwise via the brake arm 26. As a result, the brake shoe 11 is reduced in diameter, and the rod 51** is locked.

Both sides of the forward end **26*a* of the brake arm 26 in a direction to move the arm are designed in arcuate shape as it is evident from FIG. 3 so that the brake arm 26 is moved smoothly following the movement of the brake piston 32. On the contrary, the side turned by 90 degrees from the arcuate sides is designed as a flat surface. It is closely fitted on both side walls of the channel 34 and serves as the means to stop rotation of the brake piston 32**.

On the cylinder body 30 of the brake cylinder means 4, there are provided an opening 35 for maintaining a space where the brake arm 26 moves and an inspection window 36 for visually inspecting the position of the brake piston 32 from outside. The inspection window 36 is covered by a transparent or opaque cover 37.

In FIG. 3, the reference numeral 40 represents a fixing bolt for temporarily fixing the brake piston 32 when the locking device 1 is mounted on the fluid pressure cylinder 50, the reference numeral 41 represents a magnetic sensor for detecting the position of the piston, detecting a magnet 42 (FIG. 3) in the brake piston 32 and issuing signals, and it is mounted in mounting grooves 43 formed on one side of the cylinder body 30 so that it can be fixed at any position as desried.

In the locking device as described above, the shoe holder 10 with the brake shoe 11 mounted on it and an eccentric cam means 18 are incorporated in the body 2, and the cover 3 is mounted. Then, a mounting screw is passed through the cover 3 and placed into a screw hole 45 of the body 2, and the body 2 and the cover 3 are fixed. Next, the forward end 26*a* of the brake arm 26 projecting from the cutout 5*a* is inserted into the channel 34 of the brake piston 32. By mounting the brake cylinder means 4 on the body 2 and the cover 3 by means of a mounting screw (not shown), the locking device 1 can be assembled.

In this case, the supporting position, i.e. the mounting position of the shoe holder 10, is adjusted by moving the stopper 17 back and forth, and the gap between the operating piece 15 and the roller bearing 25 can be adjusted. As a result, even when there are manufacturing errors in the shoe holder 10 and the eccentric cam means 18, the errors can be overcome, and erroneous operation can be eliminated.

In the locking device 1 thus assembled, the rod 51 of the fluid pressure cylinder 50 is passed through the brake shoe 11 in the body 2 as shown in FIG. 1. With an end of the rod cover 52 engaged in the mounting hole 7 of the cover 3, the body 2 and the cover 3 are fixed on the rod cover 52 of the fluid pressure cylinder 50 using mounting bolts 44 (FIG. 2) and are mounted on the fluid pressure cylinder 50. Therefore, it can be easily mounted on a currently operating fluid pressure cylinder 50, which is not provided with a locking device.

Also, the above locking device 1 can be mounted on the fluid pressure cylinder 50 by well-known means other than mounting bolts.

When the locking device 1 is mounted on the fluid pressure cylinder 50, if the brake piston 32 is pushed by the brake spring 33 and is at the restored position, the operating piece 15 of the shoe holder 10 is pushed by the eccentric cam means 18, and the operation must be done with the diameter of the brake shoe 11 in reduced state (locked state). This makes the operation very difficult to accomplish. As shown in FIG. 3, however, it is possible to accomplish the operation in the locking device 1 with the brake piston 32 temporarily fixed at lock releasing position using the fixing bolt 40. Thus, the mounting operation can be easily accomplished. It is needless to say that the fixing bolt 40 is removed after the mounting of the locking device 1 has been completed.

When compressed air is supplied from the port 31 to the brake cylinder means 4, the brake piston 32 is moved to the position shown in FIG. 3, and the eccentric cam means 18 is rotated counterclockwise (lock releasing direction) via the brake arm 26, and the roller bearing 25 is softly pressed on the operating piece 15 of the shoe holder 10. Therefore, no pressing force is applied on the shoe holder 10, and the rod 51 of the fluid pressure cylinder 50 can achieve free reciprocal movement.

When compressed air supplied to the brake cylinder means 4 is discharged, the brake piston 32 is moved leftward from the position of FIG. 3 by resilient force of the brake spring 33, and the eccentric cam means 18 is rotated clockwise via the brake arm 26. Thus, the eccentric cam means 18 pushes the operating piece 15 via the roller bearing 25 for pushing. As a result, the shoe mounting hole 12 and the brake shoe 11 are reduced in diameter, and the brake shoe 11 firmly grasps and locks the rod 51.

Thus, the rod 51 can be locked in any direction and at any position as desired. Therefore, mounting operation is done easier than in the conventional type device, which can lock only in a fixed direction. Even when the rod 51 is to be locked in two directions, i.e. in incoming and outgoing directions, there is no need to provide two sets of locking devices. This makes it possible to design the fluid pressure cylinder 50 with locking device in more compact size.

Further, when pneumatic pressure of the fluid pressure cylinder 50 and the brake cylinder means 4 is decreased or lost due to accident during operation of the fluid pressure cylinder 50, the brake piston 32 is restored to the initial position by resilient force of the brake spring 33 and the device is locked as in the case where compressed air is discharged from the brake cylinder means 4. Thus, the rod 51 is not unexpectedly moved due to weight of the load.

Operating condition of the brake cylinder means 4 can be checked from outside the system by visual inspection of the position of the brake piston 32 through the inspection window 36 on the cylinder body 30.

the locking device 1 as described above, the eccentric cam means 18, the shoe holder 10 and the brake shoe 11 are rotated at given positions or are reduced in size, and the locking device 1 is not moved in axial direction. Also, the brake cylinder means 4 moves the brake piston 32 in a direction perpendicular to axial direction of the locking device 1. As a result, the length of the locking device 1 in axial direction of the rod can be reduced, and it is possible to design the locking device 1 in smaller size.

Also, because the eccentric cam means 18 pushes the operating piece 15 via the roller bearing 25, which is freely rotatable, the loss of pushing force of the eccentric cam means 18 can be minimized unlike the case where a cam member slides over and pushes the operating piece 15. Thus, higher pushing force can be applied, and it is possible to prevent wearing of the mechanisms.

Further, the length of the operating piece 15 of the shoe holder 10 is made longer than the supporting piece 14, and the length of the brake arm 26 is designed sufficiently long in comparison with the eccentricity of the cam unit 24*a* in the eccentric cam means 18. Also, the eccentric cam means 18 rolls over by means of the roller bearing and pushes the operating piece 15. By the cumulative effects, the device can lock the rod 51 with higher force despite of its small size.

Moreover, through the adjustment of the position of the shoe holder 10 by the stopper 17, the variations of the locking force due to the possible manufacturing errors on the shoe holder 10 or the eccentric cam means 18 can be easily adjusted. If the force to lock the rod 51 is decreased because of the wearing of components, the locking force can be restored to normal value by adjusting the supporting position by the stopper 17.

Figure 6:
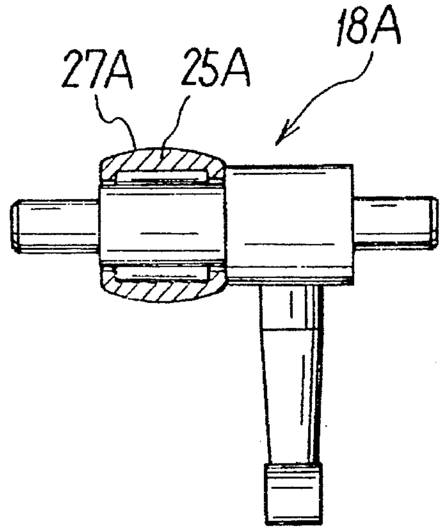
FIG. 6 is a side view of a variation of the eccentric cam means.

FIG. 6 represents a variation of the eccentric cam means. In this eccentric cam means 18A, outer peripheral surface 27A of an outer ring of the roller bearing 25A is not flat, and it is different from the eccentric cam means 18 in that it is designed in arcuate shape with the largest diameter at the center in axial direction. The outer peripheral surface 27A of outer ring of the roller bearing 25A is designed in arcuate shape, and even when there are variations in parallelity between the eccentric cam means 18A and the pushed surface of the operating piece 15, it is possible to ensure reliable operation because the variations can be overcome. Therefore, eccentric load of the roller bearing 25A is absorbed and its service life can be made longer.

The brake cylinder means 4 may not be used. In such case, the operating piece 15 is pushed by moving the brake arm 26 projected from the cutout 5*a* by manual operation.

What is claimed is:

1. A locking device for a fluid pressure cylinder, comprising:

a body mounted on the fluid pressure cylinder in such manner that a piston rod of the cylinder passes therethrough;

a shoe holder arranged inside said body, said shoe holder having a shoe mounting hole with a diameter reducible by providing a slit, and said rod is passed through said shoe mounting hole when said body is mounted on the fluid pressure cylinder;

a brake shoe mounted in a shoe mounting hole of said shoe holder and for finely holding the rod as the brake shoe is reduced in diameter when the mounting hole is reduced in diameter; and eccentric cam means for reducing the shoe mounting hole in diameter by exerting pressure on said shoe holder, said eccentric cam means comprising a cam shaft rotatably supported at a given position on said body, a cam member arranged eccentrically on said cam shaft and pressing said shoe holder in a direction to reduce the shoe mounting hole in diameter when said cam shaft is rotated in a locking direction, and releasing the pushing pressure when the cam shaft is rotated in an unlocking direction, and a brake arm extending from said cam shaft in a lateral direction and for rotating said cam shaft in said locking and unlocking directions.

2. A locking device according to claim 1, wherein said shoe holder has a supporting piece and an operating piece for exerting force on each side of the slit respectively, said supporting piece being mounted on the body in such manner that it can be moved back and forth and the supporting piece is set on an adjustable position adjusting screw, and said operating piece being projected out of the shoe holder more extensively than the supporting piece, and said cam member of the eccentric cam means is brought into contact with the forward end thereof.

3. A locking device according to claim 2, wherein a rotatable roller bearing is mounted around the cam member of the eccentric cam means, and the cam member is brought into contact with the operating piece of the shoe holder via the roller bearing.

4. A locking device according to claim 3, wherein outer peripheral surfaces of the roller bearing are designed as curved surfaces so that it has the largest diameter at the center in axial direction.

5. A locking device according to one of claims 1 to 4, wherein a brake cylinder means for rotating the eccentric cam means is mounted on said body via said brake arm with its axial line directed in a direction perpendicular to the rod.

6. A locking device according to claim 5, wherein said brake cylinder means comprises in a cylinder body a brake piston connected to the brake arm and a brake spring for pushing the brake piston in a restoring direction, and when a pressure fluid is supplied to the brake cylinder means, the brake piston is moved in one direction and rotates the eccentric cam means in an direction, and when the pressure fluid is discharged, the brake piston is moved in an unlocking direction by resilient force of the return spring and rotates the eccentric cam means in said locking direction.

7. A locking device according to claim 6, wherein a magnet is mounted on the brake piston in the brake cylinder means, and a magnet sensor for detecting said magnet and issuing detection signals is mounted on said cylinder body.

8. A locking device according to claim 6, wherein an inspection window for visually checking the operating condition of the brake piston is provided on the cylinder body in the brake cylinder means.

9. A locking device according to claim 6, wherein the brake cylinder means comprises a fixing means for temporarily fixing the brake piston at an unlocking position when the locking device is mounted on the fluid pressure cylinder.

* * * * *